US011019768B2

(12) United States Patent
Rittershofer et al.

(10) Patent No.: US 11,019,768 B2
(45) Date of Patent: Jun. 1, 2021

(54) DOUBLE DECKER CROP RESIDUE SPREADER

(71) Applicant: Deere and Company, Moline, IL (US)

(72) Inventors: Martin Rittershofer, East Moline, IL (US); Michael T. Meschke, Geneseo, IL (US); Matthew T. Wold, Coal Valley, IL (US); Oliver Klein, Saarwellingen (DE); Marco Broschart, Herschberg (DE)

(73) Assignee: Deere & Company, Moline, IL (US)

( * ) Notice: Subject to any disclaimer, the term of this patent is extended or adjusted under 35 U.S.C. 154(b) by 353 days.

(21) Appl. No.: 15/905,586

(22) Filed: Feb. 26, 2018

(65) Prior Publication Data

US 2019/0261562 A1    Aug. 29, 2019

(51) Int. Cl.
*A01D 41/12* (2006.01)
*A01F 12/40* (2006.01)
*A01F 12/44* (2006.01)
*A01F 29/12* (2006.01)

(52) U.S. Cl.
CPC .......... *A01D 41/1243* (2013.01); *A01F 12/40* (2013.01); *A01F 12/446* (2013.01); *A01F 29/12* (2013.01)

(58) Field of Classification Search
CPC ... A01D 41/1243; A01F 12/40; A01F 12/444; A01F 12/446; A01F 12/48; A01F 29/12
See application file for complete search history.

(56) References Cited

U.S. PATENT DOCUMENTS

| 4,617,942 A | * | 10/1986 | Garner | A01F 12/40 460/112 |
| 4,913,679 A | * | 4/1990 | Bender | A01F 12/40 414/505 |
| 4,917,652 A | * | 4/1990 | Glaubitz | A01D 41/1243 239/682 |
| 5,082,186 A | * | 1/1992 | Bruns | A01D 41/1243 239/667 |
| 5,488,817 A | * | 2/1996 | Paquet | A01D 41/127 56/10.2 R |

(Continued)

FOREIGN PATENT DOCUMENTS

EP    1461994 A1    9/2004
EP    1716736 A1    11/2006
(Continued)

OTHER PUBLICATIONS

European Search Report issued in counterpart application No. 19159102.3 dated Jul. 12, 2019 (8 pages).

*Primary Examiner* — Thomas B Will
*Assistant Examiner* — Joan D Misa
(74) *Attorney, Agent, or Firm* — Rathe Lindenbaum LLP

(57) ABSTRACT

A combine double-decker crop residue spreader for use with a rotating chopper having chopper blades and through which air is blown may include a divider panel separating a lower portion from an upper portion of the spreader. The divider panel extends rearwardly from a location where the chopper blades transition from rotating towards the divider panel to rotating away from the divider. An airflow conduit extends above the divider panel in the upper portion to rearwardly direct air flow. At least one lower vertical panel below the divider panel in the lower portion rearwardly directs crop residue.

19 Claims, 8 Drawing Sheets

(56) References Cited

U.S. PATENT DOCUMENTS

| | | | | |
|---|---|---|---|---|
| 5,501,635 | A * | 3/1996 | Niermann | A01F 12/40 460/112 |
| 5,878,557 | A * | 3/1999 | Wyffels | A01D 41/127 460/1 |
| 6,196,483 | B1 * | 3/2001 | Jakobi | A01F 12/40 241/101.763 |
| 6,205,384 | B1 | 3/2001 | Diekhans | |
| 6,547,169 | B1 * | 4/2003 | Matousek | A01D 41/1243 239/661 |
| 6,558,252 | B2 * | 5/2003 | Visagie | A01F 12/444 460/100 |
| 6,572,035 | B1 * | 6/2003 | Pfeiffer | A01D 41/1243 239/650 |
| 6,860,805 | B2 * | 3/2005 | Kuhn | A01D 41/1243 460/111 |
| 6,908,379 | B2 * | 6/2005 | Gryspeerdt | A01D 41/1243 460/111 |
| 7,008,315 | B2 * | 3/2006 | Redekop | A01D 41/1243 460/112 |
| 7,044,853 | B2 * | 5/2006 | Weichholdt | A01D 41/1243 460/112 |
| 7,066,810 | B2 * | 6/2006 | Farley | A01D 41/1243 460/112 |
| 7,220,179 | B2 * | 5/2007 | Redekop | A01D 41/1243 460/112 |
| 7,331,855 | B2 * | 2/2008 | Johnson | A01D 41/1243 460/112 |
| 7,455,584 | B2 * | 11/2008 | Farley | A01D 41/1243 460/111 |
| 7,487,024 | B2 | 2/2009 | Farley et al. | |
| 7,544,126 | B2 * | 6/2009 | Lauer | A01D 41/1243 460/111 |
| 7,559,833 | B2 * | 7/2009 | Isaac | A01D 41/1243 460/111 |
| 7,927,200 | B2 * | 4/2011 | Van Overschelde | A01F 12/40 460/112 |
| 8,010,262 | B2 * | 8/2011 | Schroeder | A01D 41/1243 701/50 |
| 8,585,475 | B2 * | 11/2013 | Isaac | A01D 41/1243 460/111 |
| 8,616,945 | B2 * | 12/2013 | Ritter | A01D 41/1243 460/111 |
| 8,992,294 | B2 * | 3/2015 | Dilts | A01D 41/1243 460/111 |
| 9,107,349 | B2 * | 8/2015 | Dilts | A01D 41/1243 |
| 9,137,944 | B2 * | 9/2015 | Dilts | A01D 41/1243 |
| 9,730,390 | B2 * | 8/2017 | Maes | A01D 41/12 |
| 10,004,176 | B2 * | 6/2018 | Mayerle | A01F 7/062 |
| 10,212,882 | B2 * | 2/2019 | Mayerle | A01F 12/10 |
| 10,271,477 | B2 * | 4/2019 | Ricketts | A01D 41/1243 |
| 10,405,493 | B2 * | 9/2019 | Fauconnier | A01F 29/12 |
| 10,485,178 | B2 * | 11/2019 | Mayerle | A01D 41/1243 |
| 2002/0086722 | A1 * | 7/2002 | Kuhn | A01D 41/1243 460/100 |
| 2005/0101363 | A1 * | 5/2005 | Farley | A01D 41/1243 460/112 |
| 2006/0189362 | A1 | 8/2006 | Niermann et al. | |
| 2008/0305841 | A1 * | 12/2008 | Overschelde | A01D 41/1243 460/59 |
| 2014/0302897 | A1 | 10/2014 | Isaac et al. | |
| 2015/0351321 | A1 | 12/2015 | Shane | |
| 2016/0135377 | A1 * | 5/2016 | Ballegeer | A01D 41/1243 460/112 |
| 2018/0084718 | A1 * | 3/2018 | Baumgarten | A01D 41/1243 |
| 2018/0352748 | A1 * | 12/2018 | Rittershofer | A01D 41/1276 |
| 2019/0059218 | A1 * | 2/2019 | Rittershofer | A01D 41/1243 |
| 2019/0124849 | A1 * | 5/2019 | Farley | A01F 12/46 |

FOREIGN PATENT DOCUMENTS

| | | | |
|---|---|---|---|
| EP | 2119338 | 11/2009 | |
| EP | 2138024 A1 | 12/2009 | |
| EP | 3108737 A1 * | 12/2016 | A01F 12/00 |
| WO | 2011083128 A1 | 7/2011 | |
| WO | 2015011237 | 1/2015 | |

* cited by examiner

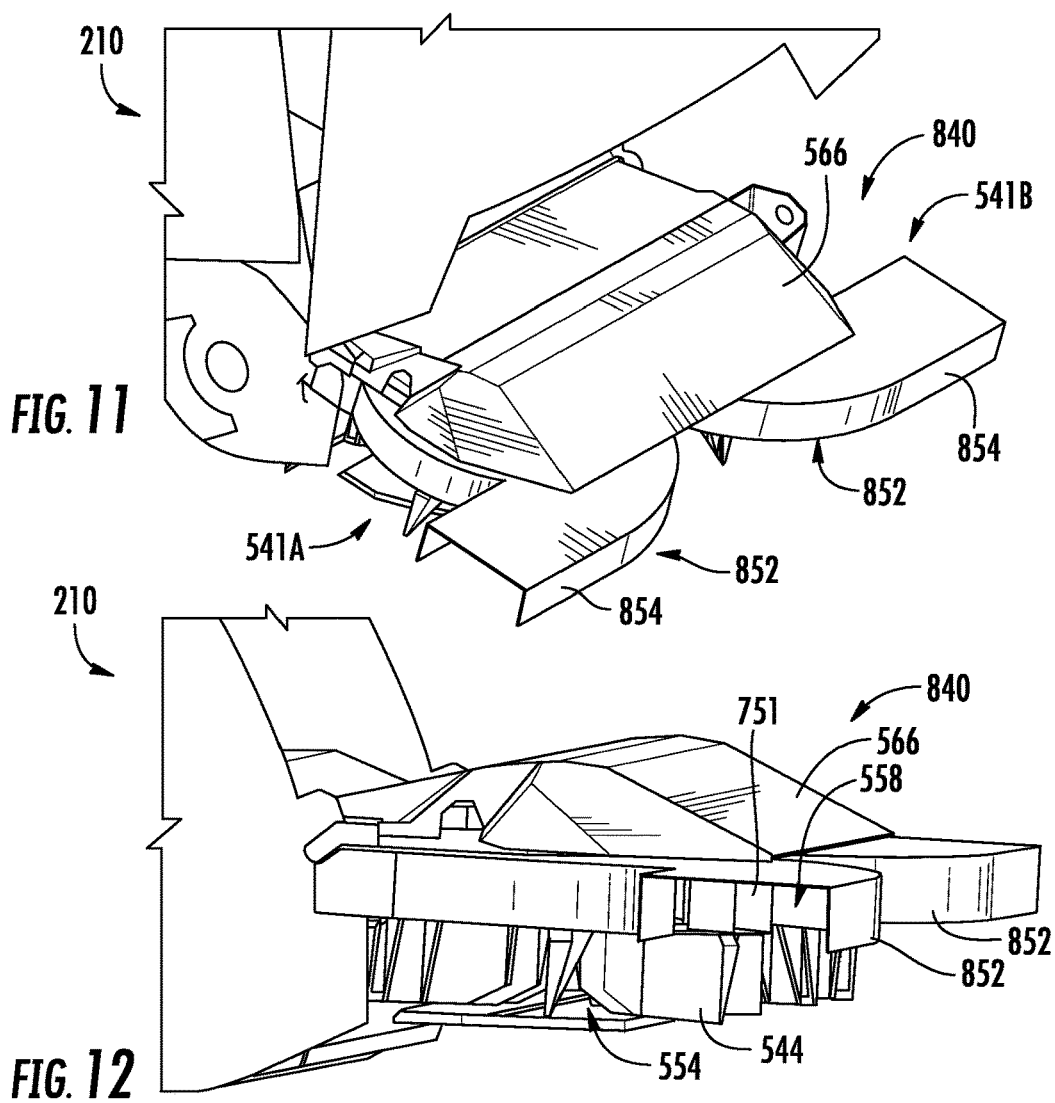
FIG. 11
FIG. 12
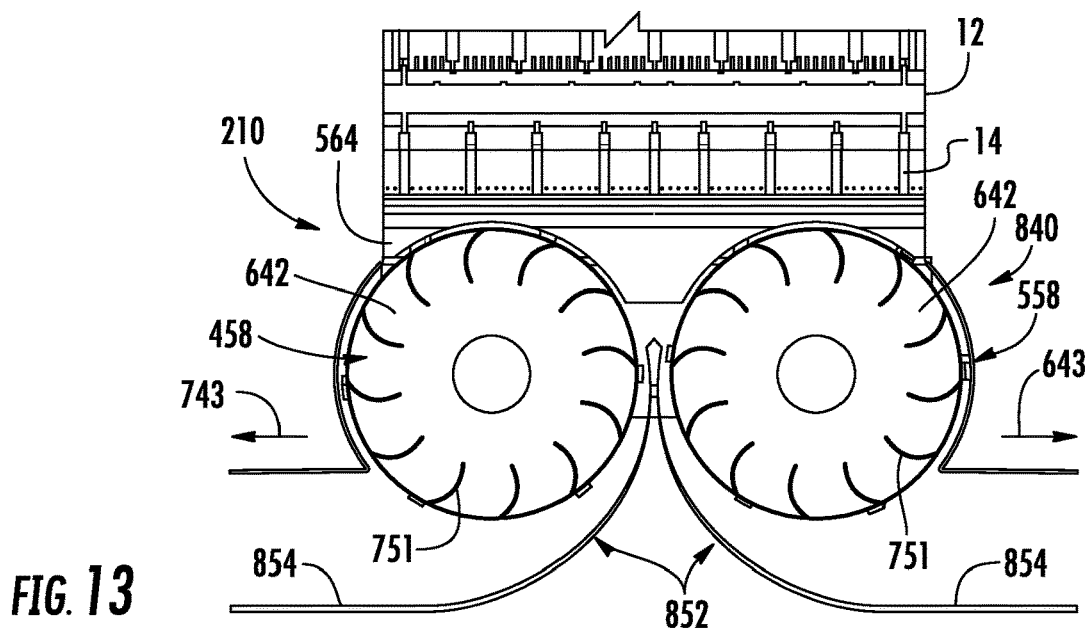
FIG. 13

US 11,019,768 B2

DOUBLE DECKER CROP RESIDUE SPREADER

BACKGROUND

Combines are utilized to separate grain or other targeted crop material from remaining material or "crop residue". The crop residue may include straw, chaff and material other than grain (MOG). Such combines may include a blower or fan that blows the crop residue towards a rear of the combine. Many combines are additionally equipped with choppers and spreaders. The lower fan blows the crop residue to the chopper which chops the crop residue into a smaller size. The chopper passes the crop residue to the spreader which distributes the chopped crop residue behind the combine as a combine traverses a field.

BRIEF DESCRIPTION OF THE DRAWINGS

FIG. 11 is a top perspective view of portions of the example combine harvester of FIG. 3 with an example double-decker crop residue spreader.

FIG. 12 is a side view of portions of the example combine harvester of FIG. 11 with the example double-decker crop residue spreader.

FIG. 13 is a sectional view of portions of the example combine harvester of FIG. 11 with the example double-decker crop residue spreader.

Figure 1:
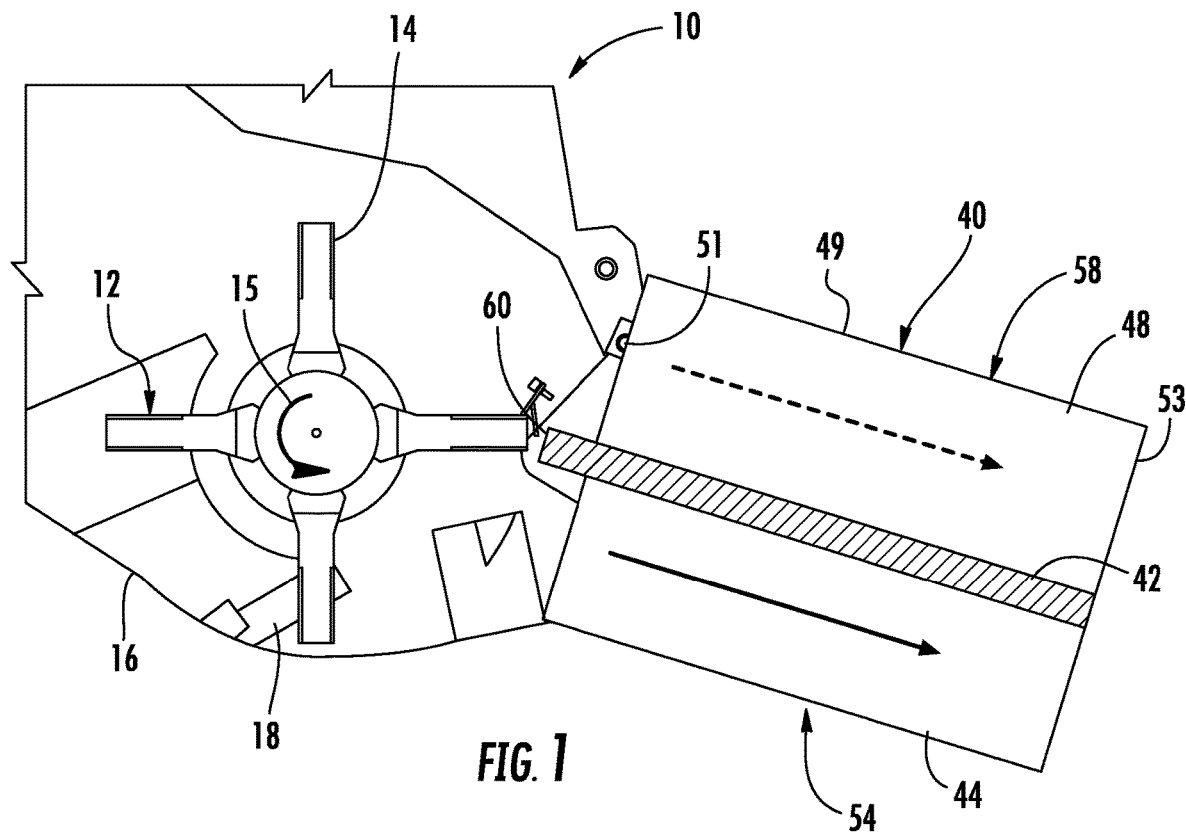
FIG. 1 is a sectional view of portions of an example combine harvester with an example double-decker crop residue spreader (schematically shown).

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example crop residue spreaders and methods that may more effectively separate grain from crop residue, that may facilitate the separation of grain from crop residue with fewer fans or less power and/or may more effectively spread and distribute crop residue behind the combine. Disclosed herein are example crop residue spreaders and methods that utilize a double-decker crop residue spreader, wherein the double-decker crop residue spreader has a lower portion through which crop residue is directed and an upper portion having an airflow conduit through which air from the blower may be discharged. The upper portion may reduce back pressure. The reduced back pressure may result in grain being more effectively separated from the crop residue by the blower, may facilitate the use of fewer blowers or lower powered blowers while still effectively separating the grain from the crop residue and may result in enhanced distribution of the crop residue.

Disclosed herein are example crop residue spreaders and methods that utilize rotating paddles in the upper portion or "upper deck" of the double-decker crop residue spreader. The rotating paddles in the upper portion enhance the discharge of excess air by sucking or drawing air through the upper portion. In some implementations, side shrouds may direct the discharged air in a sideways manner to assist in the spreading of crop residue by the underlying lower portion of the spreader. In some implementations, the positioning or direction of the side shrouds are adjustable, either manually or with powered actuators, to control the direction or angle at which air is discharged.

Disclosed herein are example crop residue spreaders and methods that rotatably drive lower paddles to spread and discharge crop residue through the lower portion or deck of the crop residue spreader and upper paddles to draw air through the upper portion or deck of the crop residue spreader. In some implementations, the lower paddles and upper paddles or driven using a drive component that is recessed within a cavity of a cover shroud extending over and at least partially enclosing the upper and lower paddles. The drive component may comprise a hydraulic motor, electric motor or portions of the gearbox which receives power through a shaft. Because the drive component is recessed within a cavity of the cover shroud, the overall height of the crop residue spreader may be reduced. In some implementations, the reduced height of the crop residue spreader may facilitate a larger opening through which un-chopped straw may be discharged from the combine over the crop residue spreader.

Disclosed herein is an example combine double-decker crop residue spreader for use with a rotating chopper, having chopper blades and through which air is blown, may include a divider panel separating a lower portion from an upper portion of the spreader. The divider panel extends rearwardly from a location where the chopper blades transition from rotating towards the divider panel to rotating away from the divider. In airflow conduit is formed above the divider panel in the upper portion two rearwardly direct air flow. At least one lower vertical panel below the divider panel in the lower portion rearwardly directs crop residue.

Disclosed herein is an example method that involves blowing crop residue, with a blower, to a rotating chopper to chop the crop residue. The crop residue, after being chopped, is directed through a lower portion of a double-decker combine residue spreader. Air from the blower is discharged through an upper portion of the combine double-decker residue spreader separated from the lower portion by a divider panel extending rearwardly from a location where blades of the chopper transition from rotation towards the divider panel to rotating away from the divider panel.

Disclosed herein is an example combine which may include a crop cleaning shoe having at least one chaffer having openings size to facilitate passage of grain and to inhibit the passage of crop residue, a blower to blow the crop residue off the at least one chaffer, a rotatable chopper located to receive the crop residue and a double-decker crop residue spreader. The double-decker crop residue spreader may include a divider panel separating a lower portion from an upper portion of the spreader and extending rearwardly from a location where the chopper blades transition from rotating towards the divider panel to rotating away from the divider panel. The crop residue spreader may further include an airflow conduit above the divider panel in the upper portion to rearwardly direct air flow and at least one lower vertical panel below the divider panel in the lower portion to rearwardly direct residue. In one implementation, the at least one upper vertical panel is a rearwardly directed stationery panel regarding the flow of air. Angling of positioning of the stationery panel may be adjusted. In another implementation, the at least one upper vertical panel comprise at least one rotatable paddle.

FIG. 1 is a sectional view schematically illustrating portions of an example combine double-decker crop residue spreader 40 mounted to a rear of a harvester or combine 10. Combine 10 comprises a rotating chopper 12 having chopper blades 14 which are rotatably driven and the direction indicated by arrow 15. Rotating chopper 12 is contained within a housing 16. In one implementation, the rotating chopper blades are interleaved with and rotate through a series of counter blades 18. In some implementations, combine 10 may additionally include a straw dam to redirect airflow in crop residue into the rotational envelope formed by the rotating chopper 12. Crop residue carried by blown air from a chaffer or sieve and straw falling from an upper portion of the combine may pass through chopper 12 for spreading by spreader 40.

As schematically shown by 1, double-decker crop residue spreader 40 extends rearward of chopper 12. Spreader 40 comprises divider panel 42, at least one lower vertical panel 44 and airflow conduit 48. Divider panel 42 comprises at least one generally horizontal panel or group of panels that separate spreader 40 into a lower portion 54 and an upper portion 58. Divider panel 42 extends rearwardly from a location 60 where chopper blades 14 transition from rotating towards divider panel 42 to rotating away from divider panel 42. Divider panel 42 extends from a location 60 where the rotation of chopper blades 14 transition from rotating rearwardly to rotating forwardly, the forward direction being the front of the combine harvester 10 which first engages the crops being harvested in a field.

The least one lower vertical panel 44 comprises at least one generally vertical panel extending below divider panel 42. The at least one vertical panel 44 forms a crop residue flow conduit that rearwardly directs or guides crop residue. In one implementation, the at least one vertical panel 44 is stationary, channeling the flow of crop residue rearwardly and, in some implementations, in an outward or transverse direction away from harvester 10. In another implementation, the at least one vertical panel 44 comprises a multitude of vertical panels which form vertical paddles, wherein the paddles are rotationally driven to further spread the crop residue being discharged.

Airflow conduit 48 comprises an airflow channel or passage extending above divider panel 42. Airflow conduit 48 rearwardly directs or guides discharge of air blown from a blower of combine 10. In the example illustrated, airflow conduit 48 bounded on its topside and its bottom side, having an inlet the one proximate chopper 12 and a rear or sideways directed outlet 53 distant chopper 12. In the example illustrated, airflow conduit 48 is formed between divider panel 42 and cover shroud 49.

In one implementation airflow conduit 48 is empty or void, channeling airflow rearwardly and, in some implementations, in an outward or transverse direction away from harvester 10 (such as when a side shroud provided). In another implementation, airflow conduit 48 contains a multitude of vertical panels which form vertical paddles, wherein the paddles are rotationally driven to further draw or suck air rearwardly out of combine 10. In some implementations, the paddles may include openings or windows through each paddle to further enhance the discharge and sucking of air out the rear of combine 10.

Figure 2:
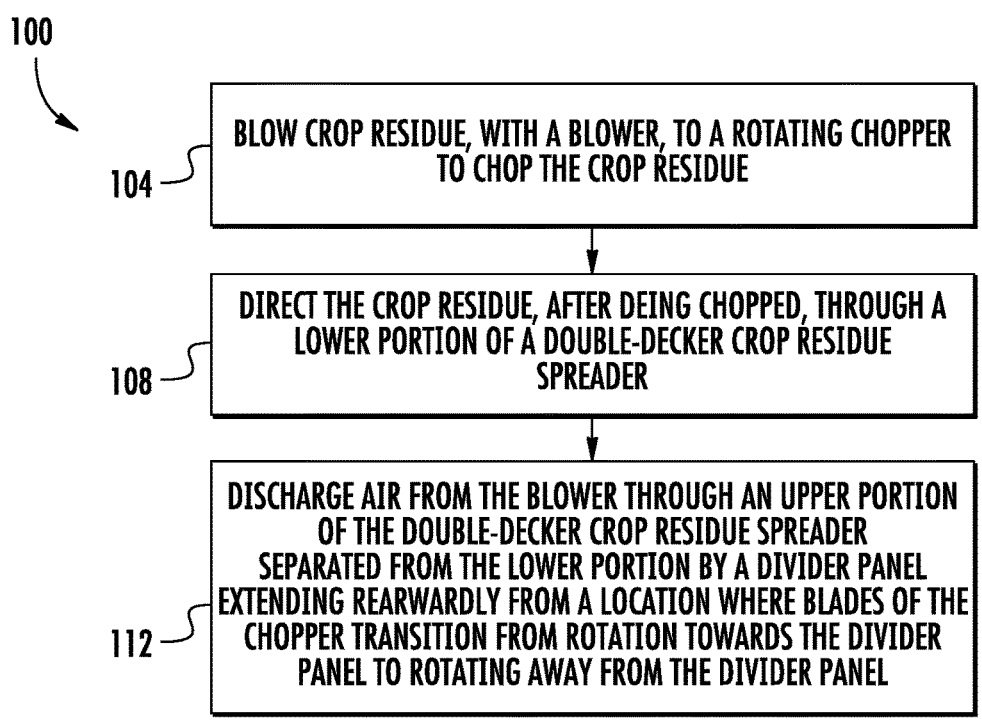
FIG. 2 is a flow diagram of an example method for spreading crop residue from a combine harvester.

FIG. 2 is a flow diagram of an example crop residue discharging method 100 for a combine harvester. Method 100 utilizes a double-decker crop residue spreader to enhance the discharge of air from the rear the combine to reduce back pressure. As a result, method 100 may facilitate the separation of grain from crop residue with fewer fans or less power and/or may more effectively spread and distribute crop residue behind the combine. Although method 100 is described in the context of being carried out by combine harvester 10 and double-decker crop residue spreader 40, it should be appreciated that method 100 may likewise be carried out with other combine harvesters and with other double-decker crop residue spreaders similar to spreader 40.

As indicated by block 104, crop residue is blown, with a blower of combine 10 to the rotating chopper 12 chops the crop residue. In one implementation, the crop residue is blown across the top of a chafer (sometimes referred to as an upper sieve) and/or across a sieve (sometimes referred to as a lower sieve). In some implementations, crop residue, such as straw, from other portions of the combine harvester may additionally be directed to the rotating chopper. In other implementations, the other crop residue comes such as straw, is directed out of the combine harvester through other openings, such as over and across the double-decker combine residue spreader.

As indicated by block 108, the crop residue, after being chopped, is directed through lower portion 54 of the double-decker, residue spreader, such as residue spreader 40. At least one lower vertical panel, such as panel 44, directs the crop residue either rearwardly and/or in a transverse sideways direction out the rear of the combine harvester. In one implementation, the at least one lower vertical panel is a stationary, rearwardly directed panel that guides the flow of crop residue. In another implementation, the least one lower vertical panel is movably driven so as to exert force upon the crop residue to further assist in expelling the crop residue from the rear of the combine harvester. For example, in one implementation, the least one lower vertical panel may comprise multiple panels that provide multiple rotating paddles, wherein the paddles are rotationally driven to expel crop residue.

As indicated by block 112, air from the blower that was used to blow the crop residue to the rotating chopper is discharged through an upper portion 58 of the double-decker crop residue spreader 40. The upper portion of the combine double-decker residue spreader is separated from the lower portion by divider panel comes such as divider panel 42, extending rearwardly from the location where blades of the rotating chopper transition from rotating towards the divider panel or rotating in a rearward direction to rotating away from the divider panel or rotating in a forward direction. This bifurcation of the total discharge region at the rear of combine 10 facilitates the propulsion of chopped crop residue by the rotating chopper through the lower portion 54 and the discharge of air through the upper portion 58.

The upper portion 58 has a lesser amount or lower degree of air flow resistance as compared to the lower portion 54 when crop refuse is being directed through lower portion 54. As a result, the rearwardly directed air from the blower is more readily discharged, reducing back pressure. The reduced back pressure enhances the ability the blown air to carry crop residue rearwardly to the rotating chopper. The reduced back pressure may further facilitate the use of smaller lower powered blowers to reduce cost, complexity and size of the blowing system. In some implementations, the air discharge upper portion 58 may further assist in spreading crop residue, discharged through lower portion 54.

The airflow through the upper portion 58 is directed through an airflow conduit 48. As described above, in one implementation, air is blown through airflow conduit 48 which guides or funnels the airflow to control the direction which the airflow is discharged. In another implementation, a rotating set of paddles may be used to further assist in the discharge of air. The rotating set of paddles may suck or draw air away from the upper half of rotating chopper 12. The suction may overcome any back pressure and may further assist in drawing crop residue rearwardly from above the chaffer and/or sieve. This suction provided by the rotating set of paddles or baffles may further facilitate the use of smaller blowers or the use of blowers running at a lower speed to reduce power consumption. In some implementations, each paddle of the rotating set of paddles may have windows to reduce air resistance while the same time drawing or sucking air out of the rear of the combine harvester.

Figure 3:
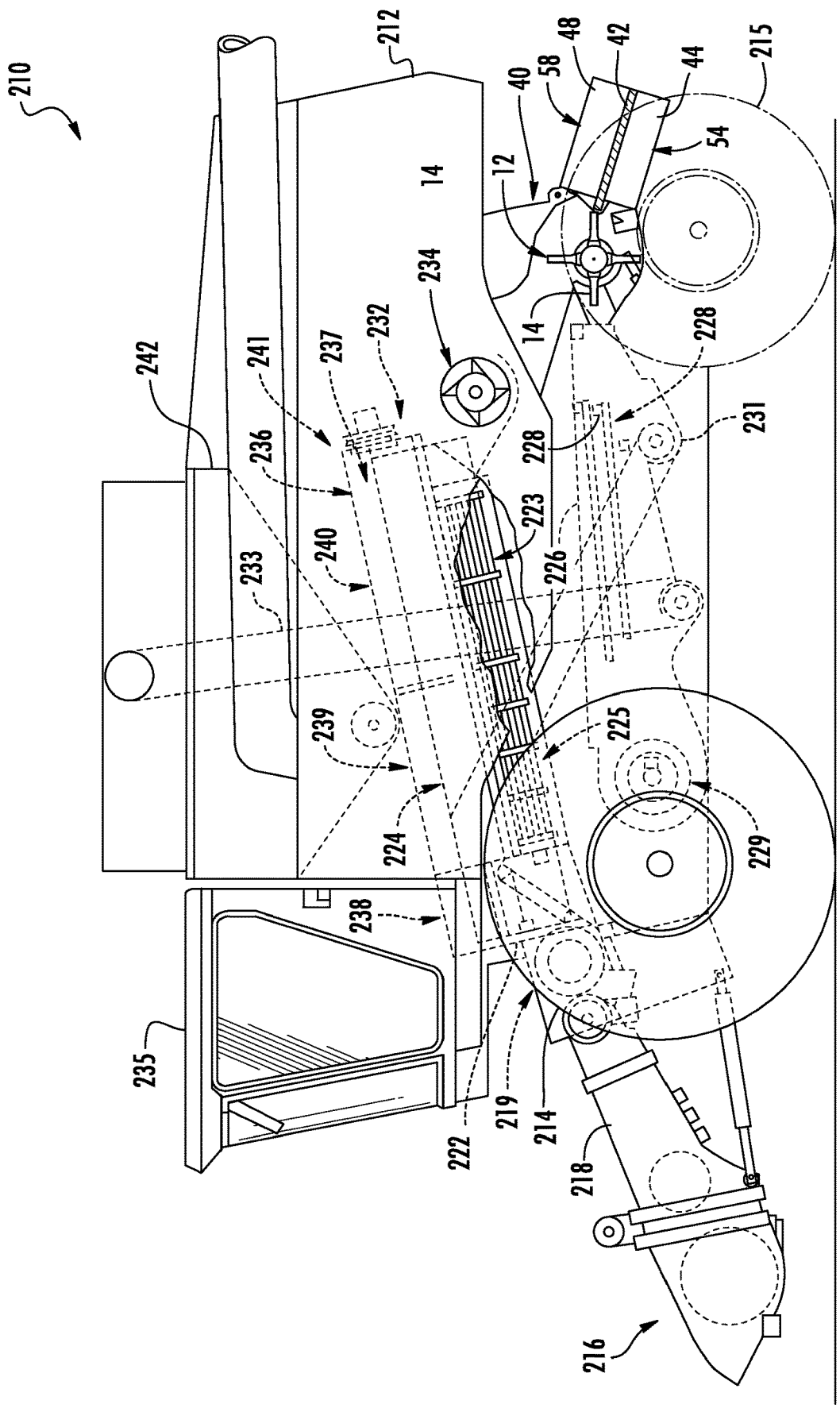
FIG. 3 is a side view of portions of an example combine harvester including the example double-decker crop residue spreader of FIG. 1.

FIG. 3 illustrates combine harvester 210, an example of combine harvester 10. In addition to double-decker crop residue spreader 40 described above, combine harvester 210 comprises a main frame 212 having wheel structure including front and rear ground engaging wheels 214 and 215 supporting the main frame for forward movement over a field of crop to be harvested. The front wheels 214 are driven by an electronically controlled hydrostatic transmission.

A vertically adjustable header or harvesting platform 216 is used for harvesting a crop and directing it to a feeder house 218. The feeder house 218 is pivotally connected to the frame 212 and includes a conveyor for conveying the harvested crop to a beater 219. The beater 219 directs the crop upwardly through an inlet transition section 222 to a rotary cleaning and separating assembly 224. In other implementations, other orientations and types of cleaning structures and other types of headers, such as transverse frame supporting individual row units, are utilized.

The rotary cleaning and separating assembly 224 threshes and separates the harvested crop material. Grain and crop residue, such as chaff, fall through a concave 225 and separation grates 223 on the bottom of the assembly 224 to a cleaning system 226, and are cleaned by a chaffer 227, sieve 228 and air fan or blower 229. The blower 229 blows the lighter crop residue above the chaffer 227 and above the sieve 228 rearwardly to the double-decker crop residue spreader 40. The grain passes through openings, between louvers, provided by the chaffer 227 and a sieve 228. The clean grain is directed to elevator 233. Clean grain elevator 233 conveys the grain to tank 242. The clean grain in the tank 242 can be unloaded into a grain cart or truck by unloading auger. Tailings fall into the return elevator or auger 231 and are conveyed to the rotor 237 where they are threshed a second time.

Threshed and separated straw is discharged from the rotary cleaning and separating assembly 224 through an outlet 232 to a discharge beater 234. In one implementation, the discharge beater 234, in turn, propels the straw to the rotary chopper 12 of spreader 40. In some implementations where the straw is chopped by chopper 12, discharge beater 234 may be omitted or other mechanism may be used to direct the straw to rotary chopper 12. In yet other implementations, the discharge beater 234 may direct the straw to a discharge outlet above spreader 40, wherein the straw is not chopped by spreader 40 prior to being discharged from the rear of combine harvester 210. The operation of the combine is controlled from an operator's cab 235.

In the example illustrated, the rotary cleaning and separating assembly 224 comprises a cylindrical rotor housing 236 and a rotor 237 located inside the housing 236. The front part of the rotor and the rotor housing define the infeed section 738. Downstream from the infeed section 238 are the cleaning section 239, the separating section 240 and the discharge section 241. The rotor 237 in the infeed section 238 is provided with a conical rotor drum having helical infeed elements for engaging harvested crop material received from the beater 219 and inlet transition section 222.

In the cleaning section 239, the rotor 237 comprises a cylindrical rotor drum having a number of cleaning elements, sometimes called rasping bars, for cleaning the harvested crop material received from the infeed section 238. Downstream from the cleaning section 239 is the separating section 240 wherein the grain trapped in the threshed crop material is released and falls to the sieve 228.

Figure 4:
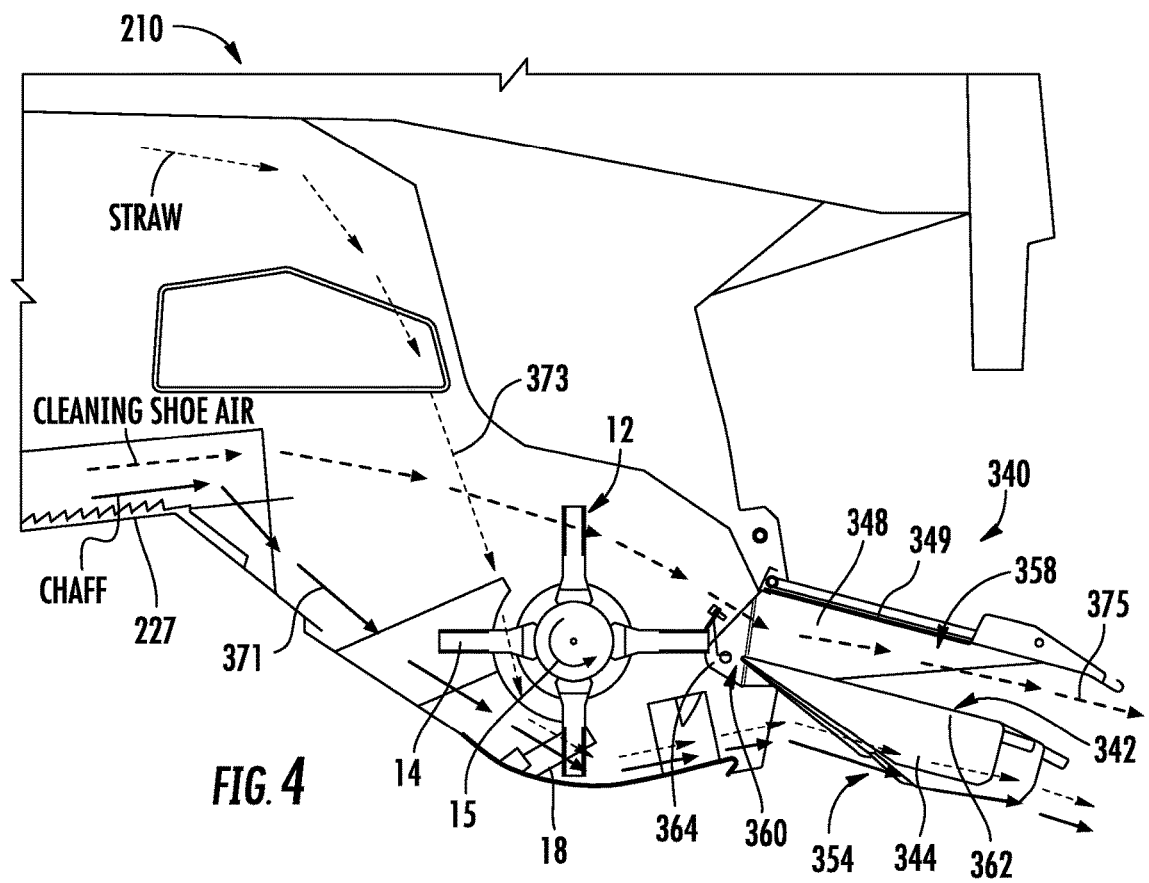
FIG. 4 is a sectional view of portions of the example combine harvester of FIG. 3 with an example double-decker crop residue spreader.

FIG. 4 is a sectional view of portions of combine harvester 210 illustrating double-decker crop residue spreader 340, an example implementation of double-decker crop residue spreader 40 described above. In the example illustrated, spreader 340 comprise a stationary arrangement of panels that direct the flows of crop residue (chaff and straw) and the flow of the "cleaning shoe air" from blower 229 (shown in FIG. 3). Spreader 340 comprises divider panel 342, lower vertical panels 344 and airflow conduit 348.

Divider panel 342 comprises at least one generally horizontal panel or group of panels that separate spreader 340 into a lower portion 354 and an upper portion 358. Divider panel 342 extends rearwardly from a location 360 where chopper blades 14 transition from rotating towards divider panel 42 to rotating away from divider panel 42. Divider panel 42 extends from a location 360 where the rotation of chopper blades 14 transition from rotating rearwardly to rotating forwardly, the forward direction being the front of the combine harvester 210 which first engages the crops being harvested in a field. In one implementation, the divider panel 342 comprises a main panel 362 extending below upper portion 358 and an additional deflector 364 which extends rearwardly from the main panel 362 into closer proximity with the rotational envelope of blades 14. In one implementation, the deflector 364 may comprise a series of spaced openings or slits through which blades 14 pass when being rotated.

Vertical panel 344 comprise at least one generally vertical panel extending below divider panel 342. As indicated by arrows 371 and 373, the at least one vertical panel 344 rearwardly directs or guides crop residue in the form of chaff and straw, respectively. Vertical panel 344 is stationary, channeling the flow of crop residue rearwardly and, in some implementations, in an outward or transverse direction (to the sides of harvester 210) away from harvester 210.

Airflow conduit 348 comprises at least one airflow channel or passage extending above divider panel 342. As indicated by arrows 375, the at least one vertical panel 358 rearwardly directs or guides discharge of air blown from a blower of combine 210. Airflow conduit 348 comprises a void or empty volume above divider panel 342 and covered by cover shroud 349, channeling airflow rearwardly and, in some implementations, in an outward or transverse direction away from harvester 210.

Figure 5:
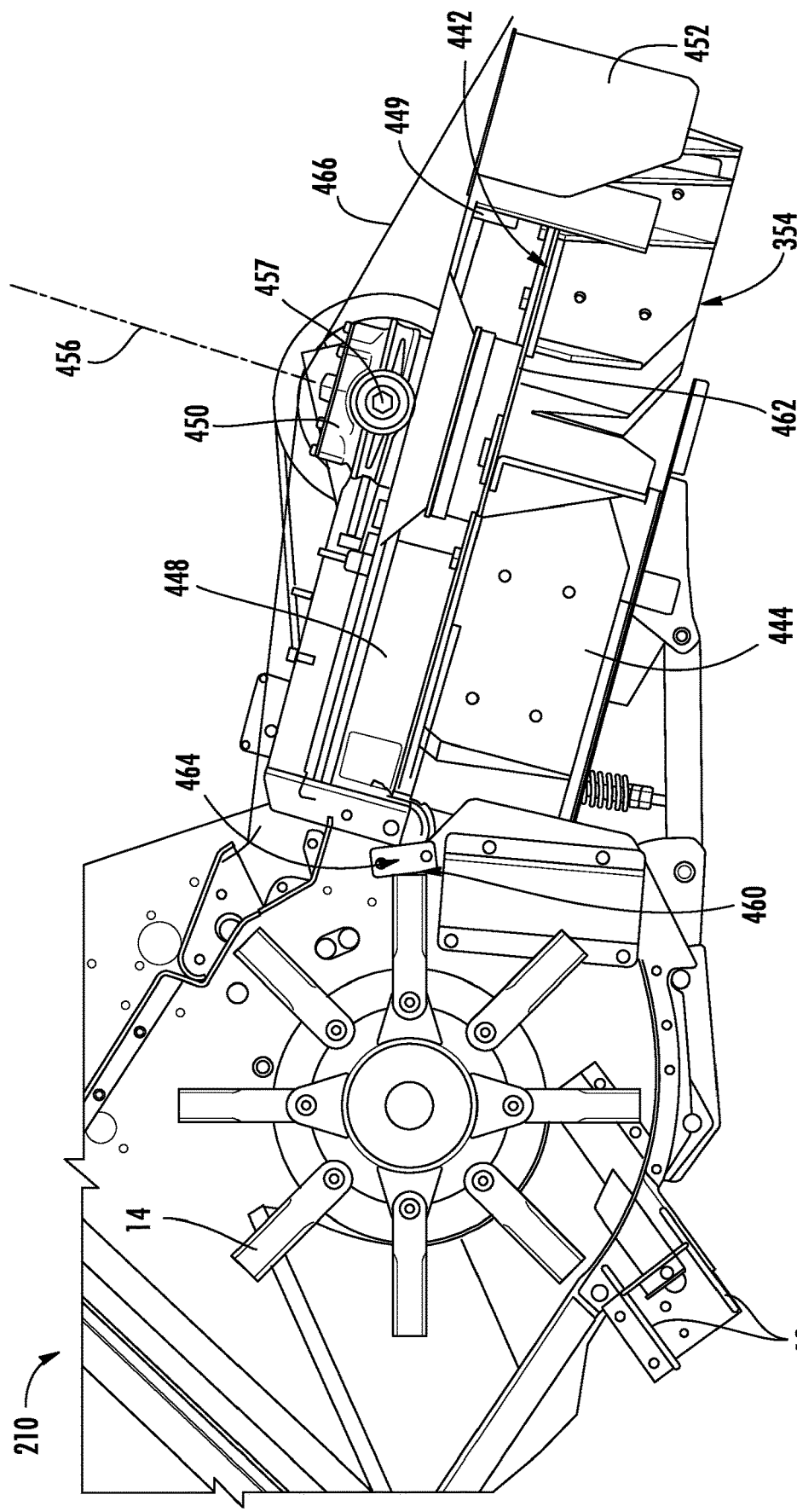
FIG. 5 is a sectional view of portions of the example combine harvester FIG. 3 with an example double-decker crop residue spreader.

FIG. 5 is a sectional view of portions of combine harvester 210 illustrating double-decker crop residue spreader 440, an example implementation of double-decker crop residue spreader 40 described above. Crop residue spreader 440 is similar to crop residue spreader 340 described above except that lower portion 354 contains a rotating set of paddles/vertical panels 444 which are rotatably driven so as to assist in expelling crop residue through lower portion 354. Crop residue spreader 440 comprises divider panel 442, lower vertical panels 444, airflow conduit 448, cover shroud 449, rotary drive 450, side shroud 452 and cover shield 466.

Divider panel 442 comprises at least one generally horizontal panel or group of panels that separate spreader 440 into a lower portion 454 and an upper portion 458. Divider panel 442 extends rearwardly from a location 460 where chopper blades 14 transition from rotating towards divider panel 442 to rotating away from divider panel 442. Divider panel 442 extends from a location 360 where the rotation of chopper blades 14 transition from rotating rearwardly to rotating forwardly, the forward direction being the front of the combine harvester 210 which first engages the crops being harvested in a field. In one implementation, the divider panel 442 comprises a main panel 462 extending below upper portion 458 and an additional scraper or deflector 464 which extends rearwardly from the main panel 462 into closer proximity with the rotational envelope of blades 14. In one implementation, the deflector 464 may comprise a series of spaced openings or slits through which blades 14 pass when being rotated.

Lower vertical panels 444 comprise generally vertical panels extending below divider panel 442. Vertical panels 444 are configured or arranged as a series of spaced vanes or paddles that extend radially outward away from a rotational axis. Vertical panels 444 are operably coupled to rotary drive 450 so as to be rotationally driven about the rotational axis, carrying and expelling crop residue (chaff and straw).

Airflow channel 448 is defined by generally vertical panel extending above divider panel 442. Airflow channel 448 extends below cover shroud 452, below rotary drive 450. Airflow channel 448 directs air in the rearwardly or to the side as directed by side shroud 452.

Cover shroud 449 comprise at least one panel extending above airflow conduit 448. In one implementation, cover shroud 449 is stationary. Cover shroud 449 underlies and supports components of rotary drive 450. In the example illustrated, cover shroud 449 comprises an upwardly facing recess or cavity receiving parts of rotary drive 450.

Rotary drive 450 comprise a drive that rotationally drives vertical panels 444, arranged as radial paddles, about rotational axis 456. In the example illustrated, rotary drive 450 comprises a drive shaft 457 operably coupled to a drive train which receives power from an internal combustion engine, directly or indirectly. Drive shaft 457 is operably coupled to vertical panels 444 (which form a rotor) by a gear train, belt and pulley arrangement or the like. In another implementation, rotary drive 450 may comprise a hydraulic motor or an electric motor directly mounted to are as part of spreader 440.

Side shroud 452 comprises a vertical panel that extends at least partially about the rotational axis 456 and at least partially about lower vertical panels 444 and airflow conduit 448. In one implementation, side shroud 452 extends at least 90 degrees about rotational axis 456. Side shroud 452 extends rearwardly around panels 444 and airflow conduit 448 and terminates prior to extending in a forward direction so as to direct the flow of crop residue and air in a transverse, sideways direction away from a centerline of harvester 210. Side shroud 452 facilitates the spreading of crop residue. The sideways direction of the airflow further enhances the spreading of crop residue.

Cover shield 466 extends over drive unit 450. In some implementations, the straw may be directed through an opening over and across the top of cover shield 466, over and across spreader 440 so as to be discharged to the rear of harvester 210 with little or no spreading.

Figure 6:
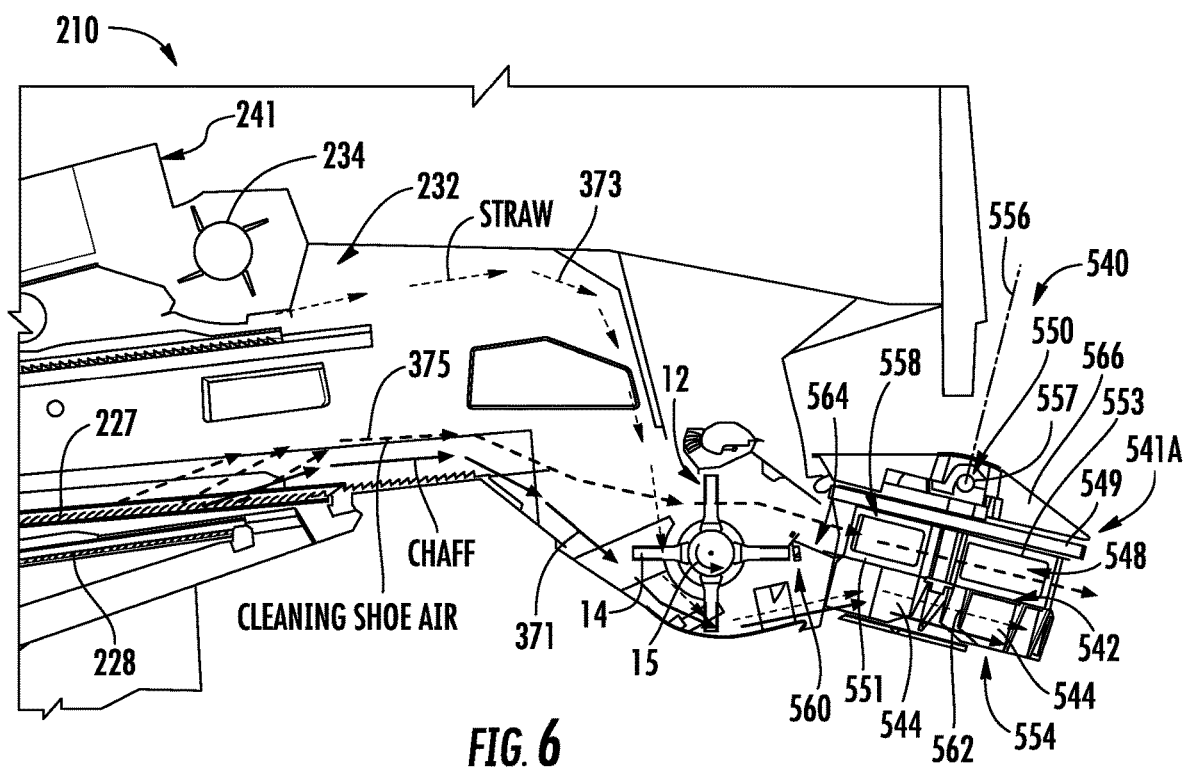
FIG. 6 is a sectional view of portions of the example combine harvester of FIG. 3 with an example double-decker crop residue spreader.
Figure 7:
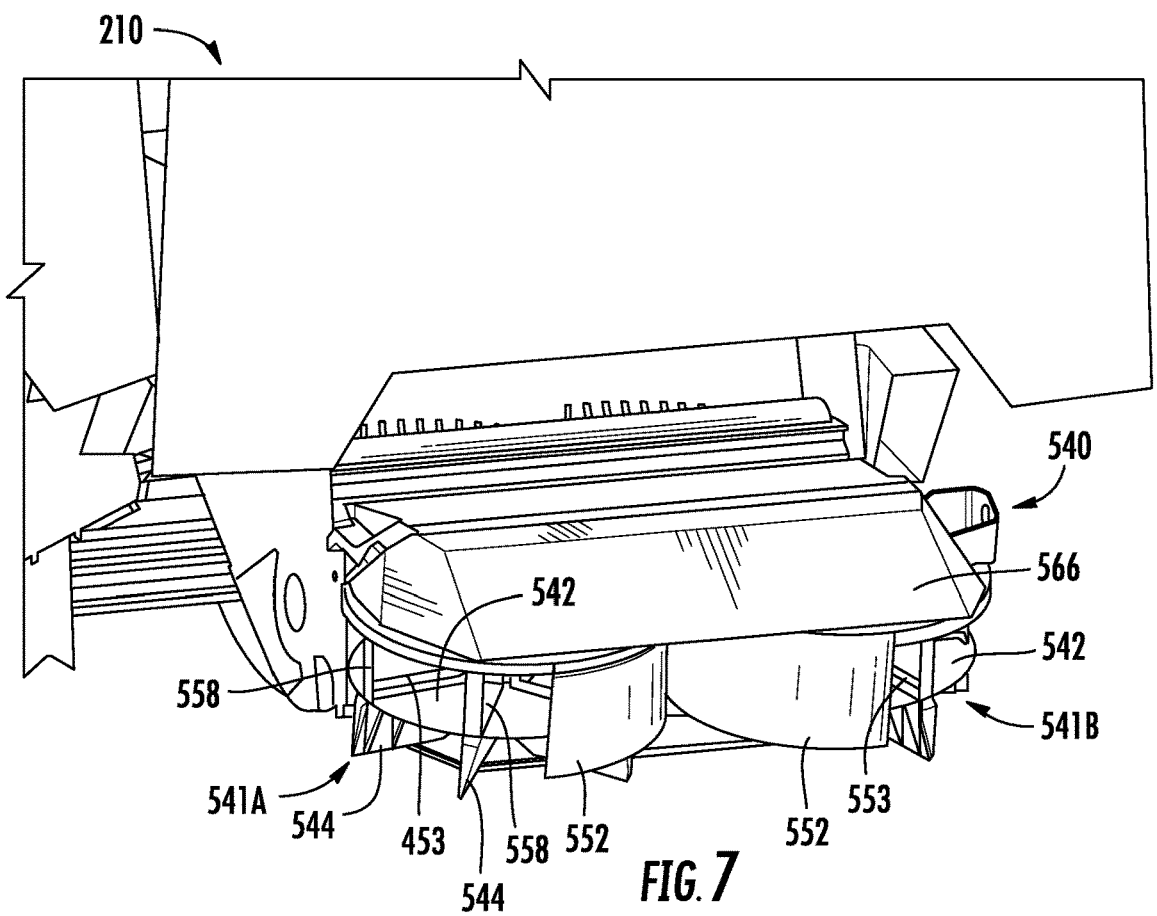
FIG. 7 is a rear perspective view of the example combine harvester of FIG. 5 with the example double-decker crop residue spreader.

FIGS. 6 and 7 illustrate portions of combine harvester 210 and portions of double-decker crop residue spreader 540, an example implementation of double-decker crop residue spreader 40 described above. FIG. 5 is a sectional view while FIG. 6 is a rear perspective view. As shown by FIG. 6, crop residue spreader 440 comprise a pair of spreading units 541A and 541B (collectively referred to as spreading units 541). In the example illustrated, each of spreader units 541 comprises vertical panels which form rotatable paddles that direct the flows of crop residue (chaff and straw) and the flow of the "cleaning shoe air" from blower 229 (shown in FIG. 3). Each of spreader units 541 comprises divider panel 542, lower vertical panels 544, airflow conduit 548, cover shroud 549, rotary drive 550, paddles 551 and side shroud 552 (shown in FIG. 7).

Divider panel 542 comprises at least one generally horizontal panel or group of panels that separate spreader 540 into a lower portion 554 and an upper portion 558. Divider panel 542 extends rearwardly from a location 560 where chopper blades 14 transition from rotating towards divider panel 542 to rotating away from divider panel 542. Divider panel 542 extends from a location 560 where the rotation of chopper blades 14 transition from rotating rearwardly (rotating away from the vertical plane that is towards a front of the harvester) to rotating forwardly (rotating towards the vertical plane that is towards the front of the harvester), the forward direction being the front of the combine harvester 210 which first engages the crops being harvested in a field. In one implementation, the divider panel 542 comprises a main panel 562 extending below upper portion 558 and an additional deflector 564 which extends rearwardly from the main panel 562 into closer proximity with the rotational envelope of blades 14. In one implementation, the deflector 564 may comprise a series of spaced openings or slits through which blades 14 pass when being rotated.

Lower vertical panels 544 comprise generally vertical panels extending below divider panel 542. As indicated by arrows 371 and 373, vertical panels 544 rearwardly direct or guide crop residue in the form of chaff and straw, respectively. Vertical panels 544 are configured or arranged as a series of spaced vanes or paddles that extend radially outward away from a rotational axis. Vertical panels 544 are operably coupled to rotary drive 550 so as to be rotationally driven about the rotational axis, carrying and expelling crop residue (chaff and straw a) as indicated by arrows 371 and 373.

Rotary drive 550 comprise a drive that rotationally drives vertical panels 544 and paddles 551, arranged as radial paddles, about rotational axis 456. In the example illustrated, rotary drive 550 comprises a drive shaft 557 operably coupled to a drive train which receives power from an internal combustion engine, directly or indirectly. Driveshaft 557 is operably coupled to vertical panels 544 and paddles 551 (which form a rotor) by a gear train, belt and pulley arrangement or the like. In another implementation, rotary drive 550 may comprise a hydraulic motor or an electric motor directly mounted to are as part of spreader 540.

Paddles 551 extend above divider panel 542. As indicated by arrows 375, paddles 551 rearwardly direct or guide the discharge of air blown from a blower of combine 210. Paddles 551 comprise a series of spaced vanes that extend radially outward away from a rotational axis stationary. In such an implementation, paddles 551 are coupled to rotary drive 550 so as to be rotationally driven about the rotational axis, drawing or sucking air as indicated by arrow 375. The rotation of paddles 551 forms a secondary blower or fan which further assists in sucking or withdrawing air out the rear of combine harvester 210. In some implementations, the suction created by the rotation of paddles 551 may be greater than any existing back pressure resulting from blowing of air by blower 229.

In the example illustrated, at least some of paddles 551 are perforate, facilitating airflow through such panels. The example illustrated, each of the paddles 551 includes at least one window 553, wherein the individual window 553 or the multiple windows, collectively, have an open area of at least a majority of the overall surface area of the respective panel/paddle 551. The at least one window 553 in each panel 551 further facilitates the exiting of air (indicated by arrows 375) through upper portion 558. In other implementations, the at least one window 553 may be omitted, wherein each panel/paddle 551 is imperforate.

In the example illustrated, paddles 551 and panels 444 driven by the same a single rotary drive 550. In one implementation, paddles 551 and panels 544 are driven at the same rotational speed. In another implementation, the differential gear train or transmission may be provided such that paddles 551 and panels 544 are driven at different relative rotational speeds or different proportional speeds by the same rotary drive 550. In one implementation, vertical panels 544, paddles 551, and divider panel 542 are formed as a single unitary body, being integral with one another, being bonded to one another, being fastened to one another or being welded to one another. In other implementations, vertical panels 544 and paddles 551 may be rotationally driven by separate rotary drives.

Cover shroud 552 comprise at least one panel extending above paddles 551. In one implementation, cover shroud 552 is stationary as paddles 551 are being rotated by rotary drive 550. Cover shroud 552 underlies and supports components of rotary drive 550

As shown by FIG. 7, side shroud 552 of each of spreader units 541 comprises a vertical panel that extends at least partially about the rotational axis 556 (shown in FIG. 6) and at least partially about lower vertical panels 544 and paddles 551. Each of side shrouds 552 extends at least 90 degrees about rotational axis 556. Side shrouds 552 extend between units 541, extending rearwardly around panel 544 and paddle 551, terminating prior to extending in a forward direction so as to direct the flow of crop residue and air in a transverse, sideways direction away from a centerline of harvester 210. Side shroud 552 facilitate the spreading of crop residue. The sideways direction of the airflow further enhances the spreading of crop residue.

In the example illustrated, each of units 541 shares a single cover shield 566. Cover shield 566 extends over drive unit 550. In some implementations, the straw being directed pursuant to arrow 375 is directed through an opening over and across the top of cover shield 566, over and across units 541 so as to be discharged to the rear of harvester 210 with little or no spreading. In other implementations, each of unit 541 may have a dedicated cover shroud.

Figure 8:
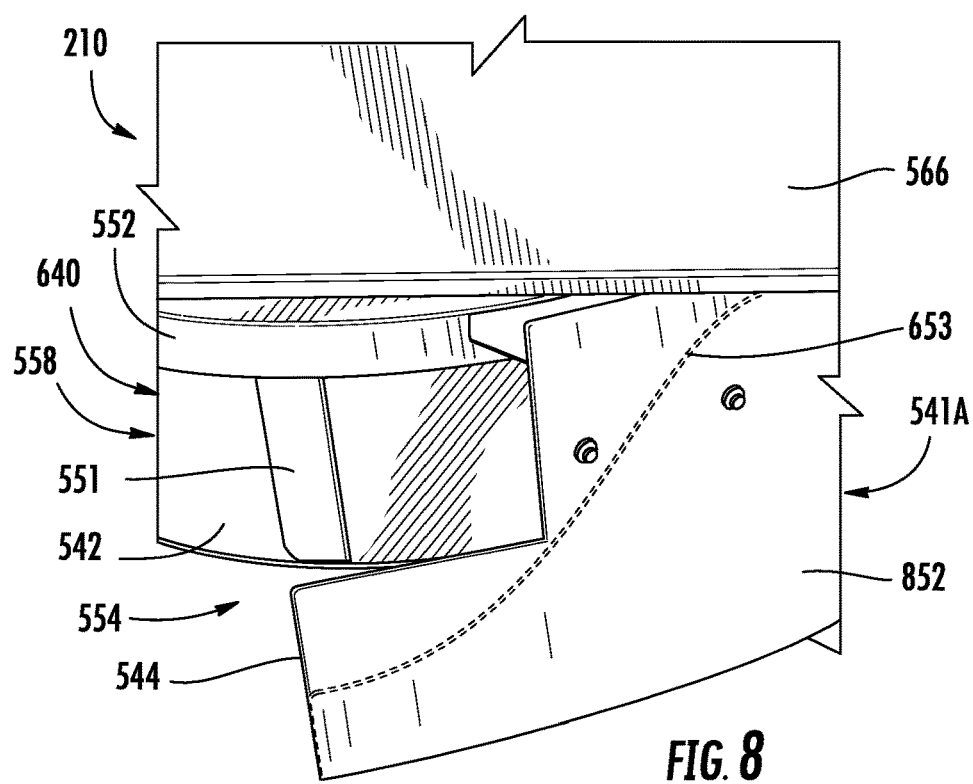
FIG. 8 is a fragmentary rear perspective view of the example combine harvester of FIG. 3 with an example double-decker crop residue spreader.

FIG. 8 is a rear perspective view of portions of harvester 210 comprising double-decker crop residue spreader 640. Double-decker crop residue spreader 540 is similar to double-decker crop residue spreader 540 described above except that each of spreading units 541 comprises side shroud 652 in place of side shroud 552. FIG. 8 illustrates side shroud 652 of spreader unit 541A. As shown by FIG. 8, side shroud 652 extends to different extents about the rotational axis of the panels 544 and paddles 551 with respect to the lower portion 554 versus the upper portion 558 of each of units 541. In the example illustrated, side shroud 652 extends to a greater extent about lower portion 554 as compared upper portion 558. This may result in air being discharged through upper portion 558 anymore rearward direction and a less sideways direction. This may result in him enhanced reduction of back pressure. Although side shroud 652 is illustrated as having a stepped profile, as shown by broken lines 653, side shroud 652 may have a variety of other alternative profiles, such as a ramped or smooth, continuous profile for controlling the discharge of crop residue and the discharge of air from portions 554 and 558, respectively.

Figure 9:
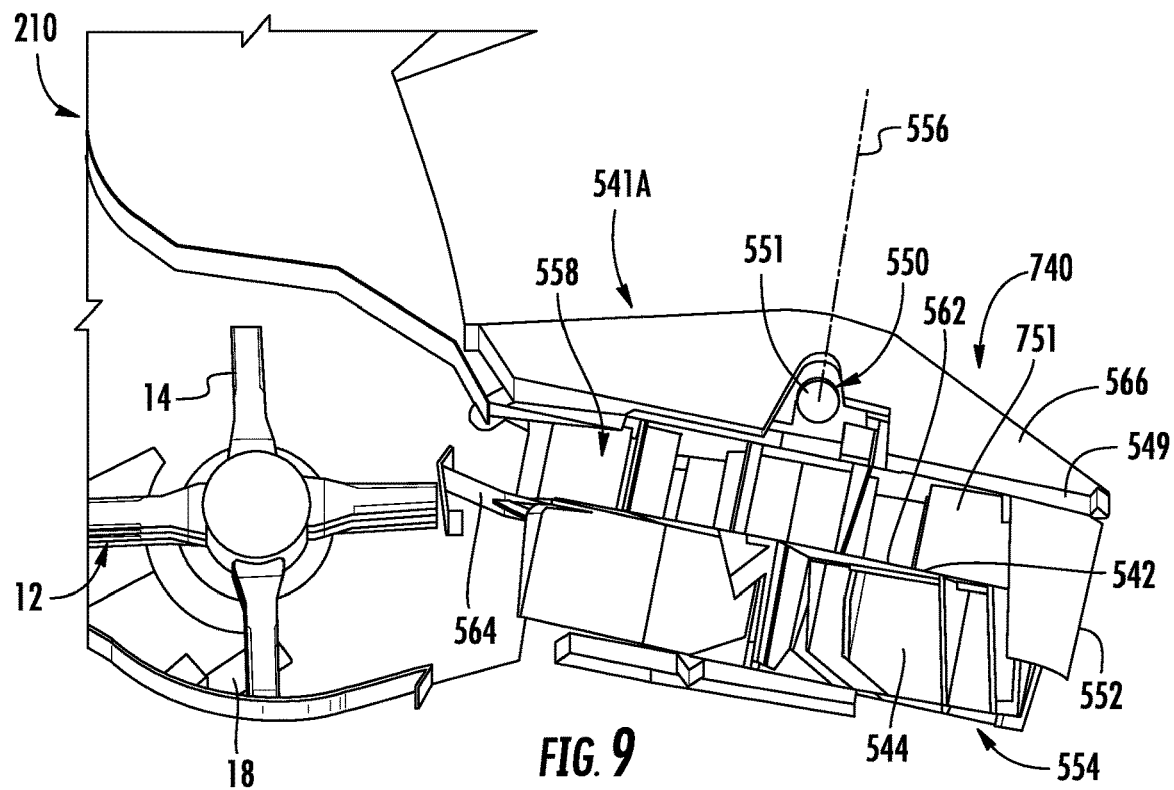
FIG. 9 is a sectional view of portions of the example combine harvester of FIG. 3 with an example double-decker crop residue spreader.
Figure 10:
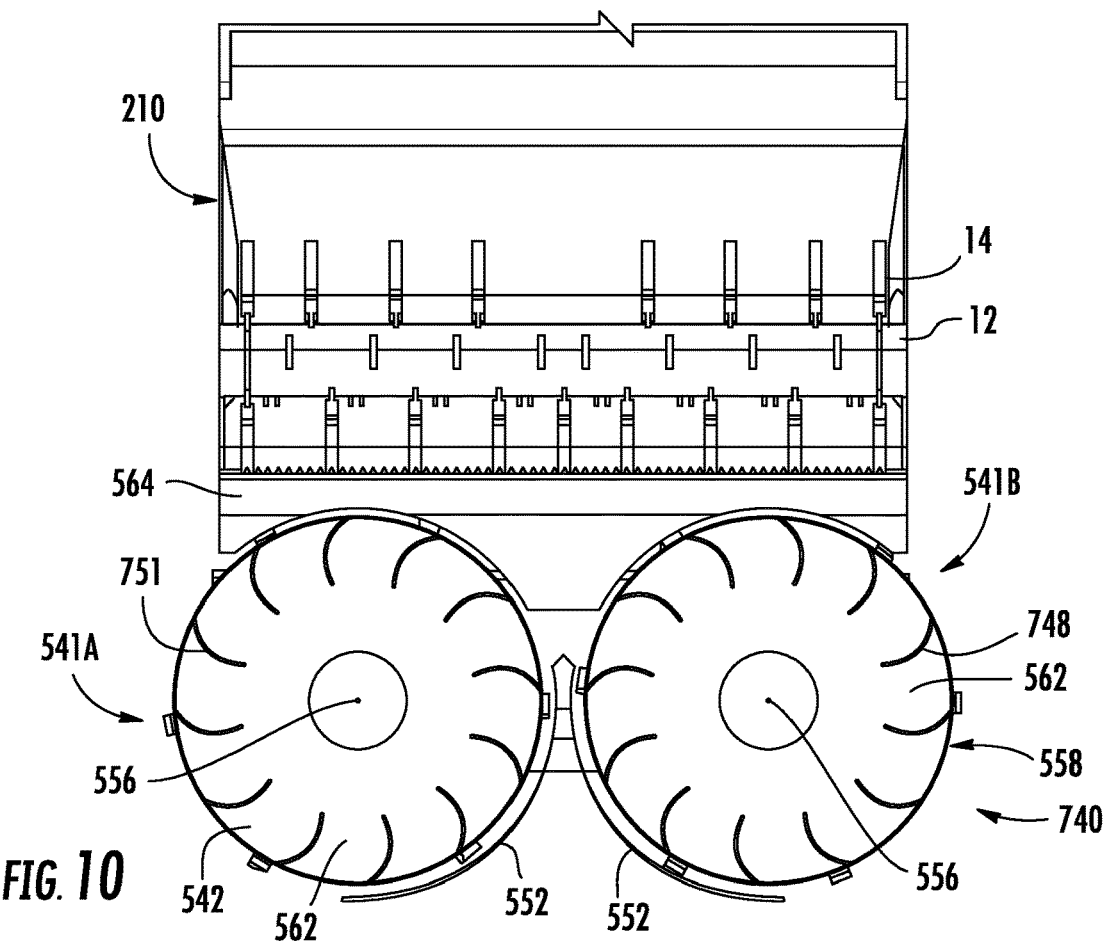
FIG. 10 is a sectional view of portions of the example combine harvester of FIG. 9 with the example double-decker crop residue spreader.

FIGS. 9 and 10 illustrate portions of combine harvester 210 comprising double-decker crop residue spreader 740. Double-decker crop residue spreader 640 is similar to double-decker crop residue spreader 540 described above except that spreader 740 comprises paddles 751 in place of paddles 551 in each of spreader units 541. Those remaining components of spreader 740 which correspond to components of spreader 540 are numbered similarly or are shown in FIGS. 6 and 7.

As with paddles 551, paddle 751 radially extend outwardly from the rotational axis 556 of the respective spreader unit 541. In contrast to paddles 551, paddles 751 have a curved shape and lack omit windows 553. The omission of window 553 and the curved shape of paddle 751 provides a concave surface facing in the direction of rotation so as to enhance the suction and drawing out of air from the rear of combine harvester 210. In the example illustrated, each of units 541 is illustrated as comprising 12 equiangularly spaced paddles 751. In other implementations, each of units 541 may have a differing number of equiangularly spaced panels.

FIGS. 11-13 illustrate portions of combine harvester 210 comprising double-decker crop residue spreader 840. Double-decker crop residue spreader 840 is similar to double-decker crop residue spreader 740 described above except that spreader 840 comprises side shrouds 852 in each of spreader units 541 in place of side shrouds 552. Those remaining components of spreader 840 which correspond to components of spreaders 740 and 540 are numbered similarly or are shown in FIGS. 6, 7 and 9-10.

Side shrouds 852 comprise panels that form sideways facing chutes or ducts 854 that extend transversely beyond the outer edges of divider panels 542 in the direction indicated by arrows 743. As shown by FIG. 12, side shrouds 852 do not extend opposite to lower portion 554 or its vertical panels 544. Side shrouds 852 discharge air further away from sides of combine harvester 210. In other implementations, side shroud 852 may additionally extend opposite to lower portions 554 so as to further direct crop residue outwardly in a sideways direction.

Figure 14:
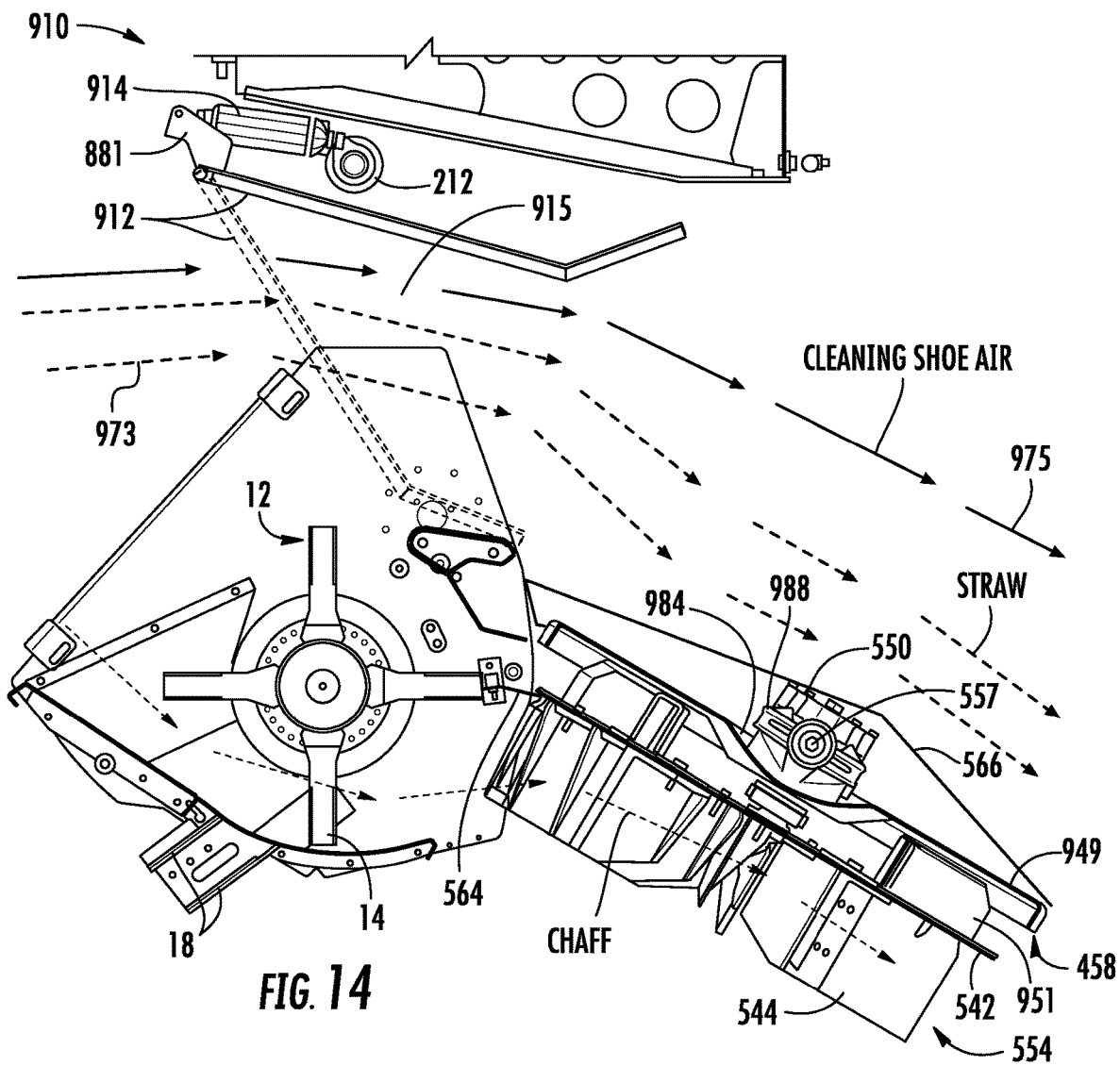
FIG. 14 is a sectional view of portions of an example combine harvester with an example double-decker crop residue spreader.
Figure 15:
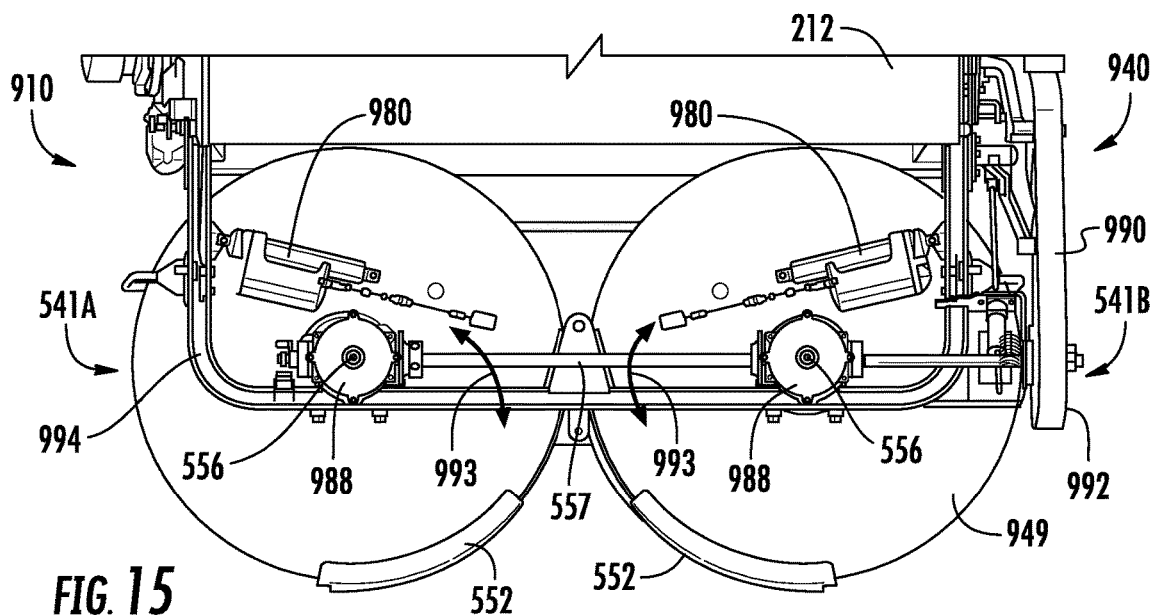
FIG. 15 is a top view of portions of the example combine harvester of FIG. 14 with portions of the example double-decker crop residue spreader.

FIGS. 14-15 illustrate portions of combine harvester 910 comprising double-decker crop residue spreader 940. Combine harvester 910 is similar to combine harvester 210 as shown and described above except that combine harvester 910 comprises door 912 and door actuator 914. Crop residue spreader 940 is similar to crop residue spreader 540 described above except that crop residue spreader 940 comprises paddles 951 in place of vertical paddles 551 and cover shroud 949 in place of cover shroud 549. As shown by FIG. 15, double-decker crop residue spreader 940 additionally comprises shroud actuators 980 for units 541. Those remaining components of combine harvester 910 and of double-decker crop residue spreader 940 which correspond to components of harvester 210 and double-decker crop residue spreader 540 are numbered similarly and/or are shown in the prior figures.

Door 912 of combine harvester 210 comprises a movable door which is pivotable between a closed position (shown in broken lines) and an open position (shown in solid lines). In the closed position, door 912 extends across a straw discharge opening 915, directing the straw and blown air to chopper 12 and ultimately through spreader 940. In the open position shown, door 912 is retracted from opening 915, allowing the blown air as indicated by arrow 975 and the straw as indicated by arrow 973 to pass through opening 915 over and across cover shield 566 and spreader 940.

Door actuator 914 selectively moves door 912 between the open and close positions or states in response to control signals received from the controller contained in a cab 235 or another remote location. In the example illustrated, door actuator 914 comprises a hydraulic cylinder-piston assembly having one end mounted to frame 212 and a second end pivotably connected to a lever arm 981 is pivotally connected to door 912. In other implementations, lever arm 981 may be part of a manual lever, or an operator may manually actuate door 912 between open and close states. In some implementations, door 912 and actuators 914 may be replaced with a permanent wall or panel, wherein straw is directed to chopper 12 as described above with respect to harvester 210.

Paddles 951 are similar to vertical paddles 551 described above except the vertical paddles 951 omit windows 553. Paddles 951 are affixed to divider panel 542 which is affixed to lower vertical panels 544 such that paddles 951 and lower vertical panels 544 all rotate in unison as a unit, being driven by the drive unit 550. In other implementations, paddles 951 may include windows 553. In other implementations, paddles 951 may be curved in a fashion similar to that described above with respect to paddle 751.

Cover shroud 949 is similar to cover shroud 549 except that (1) cover shroud 949 supports and carries side shrouds 552 of units 541 while being rotatably supported for selective rotation about axis 556 and (2) cover shroud 949 comprises a cavity 984 (shown in FIG. 14). Cavity 984 comprises a recess extending downwardly into the top surface of cover shroud 949. Cavity 984 receives components of rotary drive 550 such that rotary drive 550 may be inset or embedded within cover shroud 949. This results in the components of rotary drive 550 and the overall height of spreader 940 being reduced. In implementations where straw is directed over and across spreader 940, it may increase the size of the area through which straw may be discharged from harvester 910. In addition, spreader 940 may be supported at steeper inclinations.

In the example illustrated, cavity 984 receives a gearbox 988 comprises a gear train by which torque is transmitted from driveshaft 557 to the panel assembly formed by panels 542, 544 and paddles 951 to rotate the panel assembly. As shown by FIG. 15, torque is transmitted via a belt 990 to a pulley 992 connected to driveshaft 557. Driveshaft 557 passes through the gearboxes 988 of units 541 to rotatably drive the two panel assemblies about axes 556. In other implementations, cavity 984 may receive other components of a rotary drive. For example, in other implementations, cavity 984 may receive or inset portions of a hydraulic motor or portions of an electric motor. In one implementation, cavity 984 has a depth of at least 2 inches. In one implementation, cavity 94 has a depth of at least 4 inches.

Shroud actuators 980 comprise powered actuators that adjust the angular positioning of side shrouds 552 to control the direction in which crop residue and air are being discharged through lower portion 554 and upper portion 558, respectively. Shroud actuators 980 selectively reposition side shrouds 552 by rotating cover shroud 949 which carry side shrouds 552. Shroud actuators 980 selectively reposition side shrouds 552 in the direction indicated by arrows 993 in response to control signals received from a remote source, such as from a controller provided in cab 235 (shown in FIG. 3) or another remote location.

As further shown by FIG. 15, in the example illustrated, each of shroud actuators 980 comprises a hydraulic cylinder-piston assembly having a first end pivotably connected to a respective one of cover shroud 949 and a second end pivotably connected to a stationary and rigid support bar 994 extending from frame 212 of harvester 910. In other implementations, shroud actuators 980 may comprise other powered actuators such as electric solenoid or pneumatic cylinder-piston assemblies. In other implementations, shroud actuators 980 may be omitted, wherein manual levers are provided for repositioning side shrouds 552.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A combine double-decker crop residue spreader for use with a rotating chopper having chopper blades and through which air is blown, the combine residue spreader comprising:
   a divider panel separating a lower portion from an upper portion of the spreader, the divider panel to extend rearwardly from a location where the chopper blades transition from rotating towards the divider panel to rotating away from the divider panel;
   an air flow conduit above the divider panel in the upper portion to rearwardly direct air flow; and
   at least one lower vertical panel below the divider panel in the lower portion to rearwardly direct residue, wherein the at least one lower vertical panel comprises lower rotatable paddles, wherein the upper portion of the spreader comprises upper rotatable paddles to move air through the airflow conduit;
   a cover shroud extending above the upper rotatable paddles, the cover shroud having an upward facing cavity; and
   a drive component operably coupled to the lower rotatable paddles and the upper rotatable panels to rotate the lower rotatable paddles and the upper rotatable paddles, the drive component being at least partially received within the cavity,
   wherein the divider panel, the upper rotatable paddles and the lower rotatable paddles are fixed to one another and are rotatable in unison.

2. The combine double-decker crop residue spreader of claim 1 further comprising a side shroud extending at least partially about the lower rotatable paddles.

3. The combine double-decker crop residue spreader of claim 2, wherein the side shroud extends at least partially about the upper rotatable paddles.

4. The combine double-decker crop residue spreader of claim 2 further comprising a side shroud actuator operably coupled to the side shroud to adjust positioning of the side shroud to adjust spreading of the residue.

5. The combine double-decker crop residue spreader of claim 1, wherein the upper rotatable panels comprise windows.

6. The combine double-decker crop residue spreader of claim 1 further comprising a deflector to extend between the divider panel and the chopper blades.

7. A method for harvesting crops with a harvester, the method comprising:
   blowing crop residue, with a blower, to a rotating chopper to chop the crop residue;
   directing the crop residue, after being chopped, through a lower portion of a double-decker combine residue spreader;
   discharging air from the blower through an upper portion of the double-decker combine residue spreader, the upper portion being adjacent to a divider panel separating the upper portion from the lower portion and extending rearwardly from a location where blades of the chopper transition from rotating rearwardly, away from a front of the harvester which first engages crops, relative to a vertical plane coincident with a rotational axis of the chopper, to rotating forwardly,
   wherein the discharging of the air from the blower through the upper portion of the double-decker combine residue spreader comprises rotating at least one paddle within the upper portion of the double-decker combine residue spreader, and
   wherein the discharging of the air from the blower through the upper portion of the double-decker combine residue spreader comprises directing air through windows in the at least one paddle.

8. The method of claim 7 comprising altering positioning of a side shroud extending at least partially about the upper portion and the lower portion of the double-decker combine residue spreader to alter spreading of the crop residue.

9. A combine harvester comprising:
   a crop cleaning shoe comprising at least one chaffer having openings sized to facilitate passage of grain and to inhibit the passage of crop residue;
   a blower to blow the crop residue off the at least one chaffer;
   a rotatable chopper having chopper blades that are rotatable about a horizontal axis, wherein the rotatable chopper is located to receive the crop residue blown off the at least one chaffer; and
   a double-decker crop residue spreader comprising:
      a divider panel separating a lower portion from an upper portion of the spreader, the divider panel extending rearwardly from a location where the chopper blades transition from rotating rearwardly, away from a front of the harvester which first engages crops, relative to a vertical plane coincident with the horizontal axis of the chopper, to rotating forwardly;
      an airflow conduit adjacent to and above the divider panel in the upper portion to rearwardly direct air flow from the blower, and
      at least one lower vertical panel below the divider panel in the lower portion to rearwardly direct the crop residue.

10. The combine harvester of claim 9 wherein the at least one lower vertical panel comprises lower rotatable paddles.

11. The combine harvester of claim 9, wherein the upper portion comprises upper rotatable paddles to move air through the airflow conduit.

12. The combine harvester of claim 11, wherein the upper rotatable paddles comprise windows.

13. The combine harvester of claim 9, wherein the at least one lower vertical panel comprises lower rotatable paddles and wherein the combine harvester further comprises a side shroud extending at least partially about the lower rotatable paddles.

14. The combine harvester of claim 9 further comprising:
   a cover shroud extending over the airflow conduit, the cover shroud having an upwardly facing cavity;
   a drive component operably coupled to the at least one lower vertical panel to rotate the at least one lower vertical panel, the drive component being at least partially received within the cavity; and
   a cover shield extending over the drive component rearward of a straw outlet such that straw ejected through the outlet flows over the cover shield.

15. The combine harvester of claim 9 further comprising:
   a cover shield extending above the airflow conduit, wherein the airflow conduit is sandwiched between the cover shield and the divider panel; and
   a straw discharge passage extending over and above the cover shield.

16. The combine harvester of claim 9 further comprising a discharge beater above the rotatable chopper and located to propel straw to the rotatable chopper.

17. The combine harvester of claim 9 further comprising an unimpeded air flow passage extending rearwardly and downwardly from a rear of the at least one chaffer to the rotatable chopper.

18. The combine harvester of claim 9, wherein the rotatable chopper is located within a trough having a rear opening alongside a rear side of the rotatable chopper, the rear side opening facing the crop cleaning shoe such that the crop residue may be directly carried to the rear side of the rotatable chopper.

19. The combine harvester of claim 9, wherein the horizontal axis of the rotatable chopper about which the chopping blades are rotatable is vertically below a rear end of the at least one chaffer.

* * * * *